United States Patent [19]

Fitzgerald et al.

[11] Patent Number: 5,836,075

[45] Date of Patent: Nov. 17, 1998

[54] PROCESS FOR FORMING COMBUSTION TURBINE COMPONENTS BY TRANSIENT LIQUID PHASE BONDING

[75] Inventors: Thomas John Fitzgerald, Longwood; Thomas Walter Zagar, Winter Springs, both of Fla.

[73] Assignee: Westinghouse Electric Corporation, Pittsburgh, Pa.

[21] Appl. No.: 775,822

[22] Filed: Dec. 31, 1996

[51] Int. Cl.$^6$ .................................................. B23P 15/00
[52] U.S. Cl. ...................................... 29/889.2; 29/889.72
[58] Field of Search ............................. 29/889.72, 889.2, 29/889, 889.721, 889.722

[56] References Cited

U.S. PATENT DOCUMENTS

| | | | |
|---|---|---|---|
| 4,051,585 | 10/1977 | Walker et al. | 29/156.8 R |
| 4,492,522 | 1/1985 | Rossmann et al. | 416/241 R |
| 4,592,120 | 6/1986 | Egan et al. | 29/156.8 R |
| 4,676,843 | 6/1987 | Nazmy | 148/11.5 N |
| 4,681,251 | 7/1987 | Komatsu et al. | 228/116 |
| 4,921,405 | 5/1990 | Wilson | 416/241 R |

FOREIGN PATENT DOCUMENTS

| | | | |
|---|---|---|---|
| 0 123 702 | 4/1983 | European Pat. Off. | B23K 20/16 |
| 2 486 251 | 7/1987 | France | B23P 15/04 |
| 2 261 032 | 5/1993 | United Kingdom | F01D 5/14 |

OTHER PUBLICATIONS

"Liquid Phase Diffusion Welding of Nickel–Base Superalloy Using a Ni–B Alloyed Layer Formed on the Bonding Surface by Sputtering" Funamoto T. et al., Welding International, vol. 6, No. 4, Jan. 1, 1992 see the whole document.

"TLP* bonding: a new method for joining heat resistant alloys." Welding Journal, vol. 3, No. 4, Apr. 1974, pp. 203–214, XP002063652, see the whole document.

Funamoto et al., "Liquid Phase Diffusion Welding of Nickel–base Superalloy Using Ni–B System Alloyed Layer Formed on Bonding Surface with Sputtering", *Transactions of the Japan Welding Society*, vol. 24, No. 1, Apr. 1993, pp. 30–38.

Funamoto et al., "A Study on Formation of Alloyed LKayer of Low Melting Temperature on Bonding Surface of IN738LC with Sputtering", *Study on Diffusion Welding Using Alloyed Layer on Bonding Surface (Report 3), Yousetsu Gakkai Ronbun*, 1985.

MacDonald et al., *"Transient Liquid Phase Bonding"*, Annu. Rev. Mater. Sci. 1992 22:23–46.

*Primary Examiner*—I. Cuda
*Attorney, Agent, or Firm*—D. G. Maire

[57] ABSTRACT

Processes for constructing complex turbine structures by the assembly of less complex sub-structures. The component sub-structures are bonded together at opposed mating surfaces by transient liquid bond phase techniques. The sub-structure mating surfaces are machined prior to application of the bonding material to remove oxide from the mating surfaces and ensure dimensional tolerances. Bonding material is applied to the mating surfaces by sputter deposition. Masks can be applied to the mating surfaces prior to application of the bond material so as to selectively apply bond material at only predetermined locations on the mating surface, thus eliminating excessive use of bond material for bonding the component sub-structures.

17 Claims, 6 Drawing Sheets

PROCESS FOR FORMING COMBUSTION TURBINE COMPONENTS BY TRANSIENT LIQUID PHASE BONDING

BACKGROUND OF THE INVENTION

The present invention relates to processes for forming the hot section components of a combustion turbine so as to maintain the structural integrity and component performance levels in a high temperature operating environment throughout the desired service life of the components. Specifically, the invention relates to processes for constructing complex turbine components from a plurality of less-complex and thinner, more castable sections by application of transient liquid phase bond material to selected surfaces of the sections and assembly of the sections by coupling the bonded surfaces to form the desired component structure.

Firing temperatures in combustion turbines have been steadily rising over the years in an effort to provide high overall system thermal efficiency and maximum power output. Unfortunately, developments in the construction of the turbine components have not kept pace, particularly the development of those components that are subject to the high firing temperatures in the hot sections of the turbine, such as the turbine vanes and blades. Exposure of the components in the hot sections of the turbine to a high temperature environment decreases the mechanical integrity of the components and could shorten the component service life. As a result, it is known in the art to arrange cooling mechanisms within the blades and vanes so as to provide a flow of cooling air or steam through the hot section components and minimize thermal degradation of the components.

It is known that the blades and vanes of combustion turbines can comprise a substantially two-part design, with a thin skin that forms the desired aerodynamic profile of the blade covering a spar. In order to effectively provide cooling mechanisms within these blades and vanes it is known to construct pin fins (or tabs) between the skin and the spar such that the skin is mechanically coupled to the spar by the pin fins. Cooling air is supplied within the vanes and blades in a known manner such that the spaces between the pin fins provide channels for a flow of cooling air across the interior surfaces of the skin.

Unfortunately, because of the size and geometric constraints for the blades and vanes, it has not been feasible to effectively implement these pin fin cooling arrangements in combustion turbine components. For example, one approach to the formation of aerodynamic blades and vanes could be the construction of the spar and the skin as separate cast pieces, wherein the skin would be fitted onto the spar. It is known that deformation of the skin during assembly is unacceptable since such deformation can cause recrystilization in those component alloys that are of a single crystal design or grain boundary cracking in directionally solidified alloys. Moreover, a further problem in the construction of these blades and vanes is that, due to the large cross section of the components, it is difficult to maintain the high temperature gradients at the solidification interface of the casting that are required to grow the desired single crystal or directionally solidified microstructure.

It is also known to construct the aerodynamic profile turbine components from a plurality of smaller sections, or component sub-structures, wherein each of the sections are cast into non-complex shapes and each of the component sub-structures are subsequently bonded together to form the final aerodynamic component profile. The sub-structure sections of the overall component structure are coupled together by known transient liquid phase bonding (TLP) techniques. In this process, the bonding material is typically an alloy that is similar in its material properties to that of the component substrate material and contains a melting point depressant, such as boron. In accordance with the invention, the phrase "melting point depressant" refers to a material that, when incorporated into a bond material, reduces the melting point temperature of that bond material. The bond material is disposed between opposing surfaces of the particular sub-structures to be joined. The joint is then heated in a known manner such that the bonding material melts and the boron diffuses into the substrate material of the component sections, resulting in solidification, which can be isothermal. Coupling of the section components by this transient liquid phase bonding technique allows for the bonding of single crystal and directionally solidified crystal alloy compositions, as well as equiaxed alloy compositions, that would otherwise crack during a welding operation.

Unfortunately, there are several draw-backs to the known process for transient liquid phase bonding of component sections that make such a process complex, time consuming and costly. In order to provide a bonding material onto the surfaces of the component sections that are to be joined, the bonding material is applied in the form of a powder or a foil. When powder bonding material is used, the binder must be deposited onto the bonding surfaces in a delicate manner to avoid scattering and displacement of the powder prior to melting of the bond material. A binder material can be used to anchor the binder to the bonding surfaces of the component sections, however, it is known that pyrolysis of the binder produces an undesirable residue, generally in the form of carbides where the bonding application is carried out in a reducing atmosphere or oxides where the bonding occurs in an oxidizing atmosphere. Furthermore, due to the increased surface area of powder bonding material on the component sections, undesirable oxidation of the bond and substrate materials during the bonding operation is aggravated.

The use of foils as a bonding material presents another category of problems associated with known transient liquid phase bonding techniques. The foils are thick (about 25–100 microns) and often exhibit limited ductility such that they are difficult to cut into the precise shapes that are necessary to conform to the component surfaces to which they are applied for bonding. Moreover, the foils can rip during handling and small pieces can become lost. Thick foils introduce higher levels of melting point depressant into the final component substrate so as to undesirably reduce the incipient melting temperature of the substrate material. Finally, thick foils require longer homogenization periods and generally result in inferior bond microstructures.

Additional problems are known with the construction of complex aerodynamic component profiles by the known transient liquid phase bonding processes. Pressure is generally applied to the sections to be joined in order to break any undesirable oxide layers that may be present at the bonding surfaces and assist in the uniformity of the distribution of liquefied bond material in the joint. Pressure also minimizes the thickness of the bonded region. However, when the shapes of the component sections are complex it is difficult to apply pressure evenly over the expanse of the bonding joint. Also, the application of high pressure forces to single crystal structure alloys is undesirable due to the potential for recrystalization.

To overcome the problems associated with the use of foil and powder bonding materials, it has been attempted in the art to apply bonding material by sputter deposition techniques to the surfaces of the component sub-structures to be assembled together to form the complex component structure. Prior to the sputter deposition of the transient liquid phase bonding alloy, the bonding surfaces are cleaned with Ar-ion bombardment to remove any undesirable oxide layers. However, this technique is only known to have been demonstrated for constructing small components with a simple overall component configuration. Unfortunately, this process has not been shown to be effective for the construction of large, complex components, such as combustion turbine blades and vanes, for a number of reasons.

Where the surface of a component sub-structure that is to have the bond layer applied cannot be positioned normal to the force of gravity during the high temperature soak step of the known TLP process, the liquid phase will flow due to the effect of gravity. This can result in a lack of bonding material in the upper regions of the bonded sub-structure, leaving a weak bond in these regions. The excess bond material that accumulates at the bottom of the sub-structure can result in an alteration of the final component dimensions, as well as clogged cooling passages, in this region. Moreover, if the entire surface of the skin is coated with the bonding alloy, there will remain only a small amount of superalloy substrate material behind the sputter coat into which the melting point depressant (e.g., boron) can diffuse. This can result in softening or melting of the skin in some cases unless a high temperature soak is performed over a lengthy period to allow the melting point depressant to diffuse from the skin into the spar and over the connecting fins. Finally, in the known sputter deposition processes, in some cases it is only possible to coat an entire large surface of a component sub-structure even where it is only necessary to apply bond material to smaller surfaces of that structure in order to coupled those surfaces to opposed surfaces of the sub-structure to be assembled together. This excessive coating of the substrate in non-bonding regions increases the amount of melting point depressant in the final blade or vane design, thereby adversely affecting the material properties of the component structure.

Thus, there currently exists a need for an improved process for forming the hot section components of a combustion turbine so as to maintain the structural integrity and component performance levels in a high temperature operating environment throughout the desired service life of the components.

SUMMARY OF THE INVENTION

Accordingly, it is the general object of the current invention to provide an improved process for forming the hot section components of a combustion turbine so as to maintain the structural integrity and component performance levels in a high temperature operating environment throughout the desired service life of the components.

Briefly, this object, as well as other objects of the current invention, is accomplished in a process for constructing a component of a combustion turbine from a plurality of component sub-structures, each of the sub-structure comprising a substrate material and having at least one mating surface, the process comprising the steps of: (a) machining the mating surface of each of the sub-structures to remove oxide therefrom; (b) applying a layer of bond material on the mating surface of at least one of the sub-structures by sputter deposition, the bond material having a melting point depressant therein having a melting point temperature; (c) assembling each of the sub-structures to form the component by positioning opposing mating surfaces of each of the sub-structures into contact with each other with the layer of bond material disposed between the opposing mating surfaces; and (d) exposing the sub-structure assembly to an environment having a temperature higher than the melting point temperature, whereby the melting point depressant diffuses into the substrate material of the sub-structure assembly and the bond material solidifies to form a bond between opposing mating surfaces of the sub-structure assembly. According to a preferred embodiment of the invention, masks are applied to the mating surface of the sub-structures prior to application of the bond layer thereto in order to selectively apply bond material at only predetermined locations on the mating surface. The mating surfaces of the sub-structures to which bond material is applied are machined prior to application of the bond material to remove oxide from those mating surfaces and to provide desired dimensional tolerances for the component structure.

DETAILED DESCRIPTION OF THE PREFERRED EMBODIMENTS

The present invention provides improved methods for forming metallic substrates used, for instance, in the hot sections of gas turbines, combustion turbines, and aero-jet engines to extend their useful life. Examples of turbine components which can be constructed in accordance with the invention include gas turbine combustors, transitions, blades and vanes.

Referring to the drawings, there is shown in FIGS. 1A–1F an assembly of a spar and platform sub-structures in accordance with the invention. The spar 10 is cast together with a portion of the platform 12 in a non-complex configuration so as to form a spar-platform sub-structure assembly 14. In accordance with the process of the present invention, the spar can be originally cast in a configuration that is the same general shape as the final desired spar configuration, without any requirement for strict dimensional tolerances in the cast. The remaining portions of the platform are separately cast as platform sub-structures 16, 18. The spar-platform substructure 14 and the platform sub-structures 16, 18 will be bonded together to form the final desired spar and platform configuration in accordance with the process described herein.

Figure 1A:
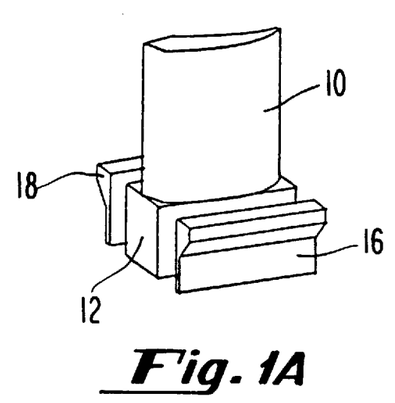
FIGS. 1A–1F illustrate an assembly of a spar and platform sub-structures in accordance with the invention.
Figure 1B:
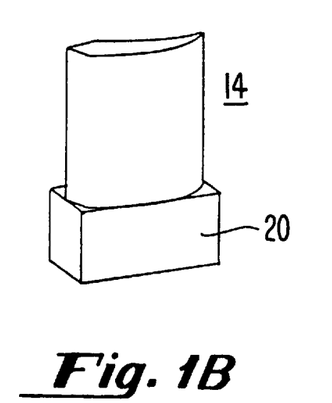

The spar-platform substructure 14 and the platform sub-structures 16, 18 will be joined together by the bonding of selected mating surfaces on each of these sub-structures. Before bonding, in a preferred embodiment, each of the mating surfaces, such as mating surface 20 of the spar-platform substructure 14, are electrochemically machined to remove any oxide layer from these surfaces. Alternatively, oxide can be removed from the mating surfaces by electrodischarge machining or other known machining operations. Also, the dimensional tolerances of the sub-structures can be provided for during the machining operation. As is known in the art, it has previously been necessary to apply pressure to the component sub-structures during the TLP bonding application in order to break any oxide layers on the mating surfaces so that the bonding material comes into contact with the surfaces of the substrate. Unfortunately, it is known that the application of large pressure forces to the sub-structures during the bonding process poses a risk of structural damage to the resulting component. In accordance with the present invention, since the opposed mating surfaces of the sub-structures are electrochemically or electrodischarge machined prior to bonding, this surface preparation step to remove oxide layers before bonding could reduce, or eliminate, the necessity for application of pressure forces to the sub-structure during the bonding phase.

As an alternative to electrochemical and electrodischarge machining, the mating surfaces can be micromachined to remove any oxide layers and ensure that the dimensional tolerances of the sub-structures are satisfied. As is known, micromachining is similar to conventional machining, however, dimensional tolerances down to the micron level and surface roughness down to the nanometer are achievable by micromachining.

Figure 1C:
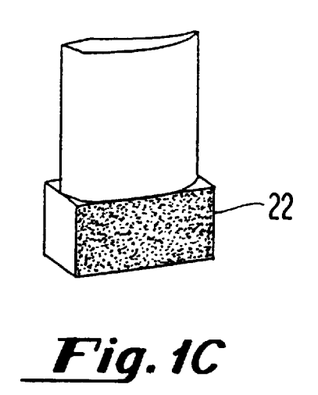

As shown in FIG. 1C, after the machining of the mating surfaces of the sub-structures to be bonded together, a TLP bonding layer 22 is applied to the mating surfaces of the sub-structures (such as mating surface 20) by a sputter deposition process. Prior to application of the bonding layer onto the mating surfaces by sputter deposition, the polarity of the sputter unit can be reversed in a known manner in order to sputter etch away any oxide that may form on the mating surface during the period between the machining step and the sputter deposition step.

The TLP bonding material preferably comprises an alloy that is the same as, or similar to, the substrate alloy of the sub-structure, with the addition of a melting point depressant (referred to as a TLP bonding agent). The blades and vanes of combustion turbines that can be constructed in accordance with the invention generally comprise a nickel-based superalloy, however, the present invention is not intended to be limited to these superalloy blade and vane designs. The melting point depressant material is preferably boron, with another melting point depressant material being silicon.

Known sputter deposition techniques make it possible to provide a TLP bonding layer onto the sub-structure mating surfaces at a substantially uniform thickness down to about 10 microns. It has previously been possible to apply conventional bonding foils onto the sub-structure mating surfaces at a thickness of about 50 microns. Since the homogenization period for the bond material in the liquid phase during TLP bonding is a function of the quantity of bond material, and since homogenization times for prior art process generally range from about one-half of a day up to a week, sputter deposition of the bond material onto the mating surfaces can significantly reduce the time required to construct the final component configuration. Moreover, since sputter deposition reduces the amount of melting point depressant used in the bonding process, the amount of melting point depressant in the final blade or vane configuration is reduced.

Figure 1D:
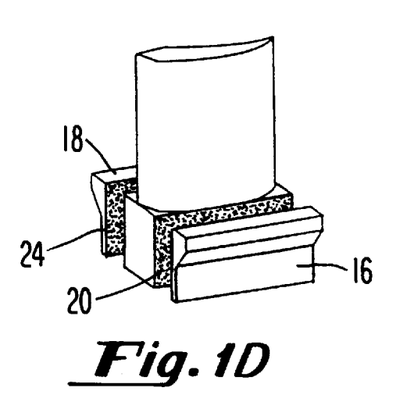
Figure 1E:
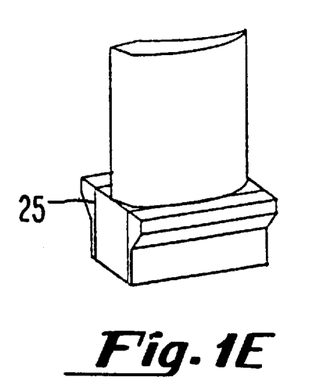
Figure 1F:
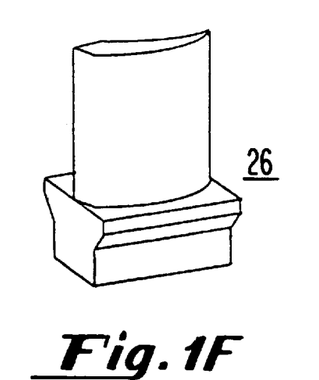

As shown in FIG. 1D, after the TLP bond material is applied to the mating surfaces of the sub-structures to be joined together, the mating surfaces 24 of the platform sub-structures 16, 18 (having a TLP bonding layer thereon) are aligned with the mating surfaces 20 of the spar-platform sub-structure. Referring to FIG. 1E, these sub-structures are then coupled together such that the bond material layer is sandwiched between opposed mating surfaces of the sub-structures at junctures 25. This joined component structure is then subjected to a high temperature heat soak environment in a furnace (without the presence of oxygen) for a predetermined period of time such that, due to the effect of the melting point depressant in the bond material, the bond material melts into a liquid phase and the melting point depressant diffuses into the substrate superalloy. During the heat soak operation, the superalloy substrate material is not significantly affected in an adverse manner by the heat soak conditions and the chemical composition and microstructure of the substrate superalloy are substantially maintained. As the melting point depressant material diffuses into the substrate material, solidification of the bond material can occur such that a mating bond is formed between the joined opposed surfaces of the component sub-structures. As shown in FIG. 1F, after the heat soak operation, a unitary spar and platform assembly 26 having a desired final configuration is ready for bonding of the skin thereto in accordance with the process of the invention.

Figure 2A:
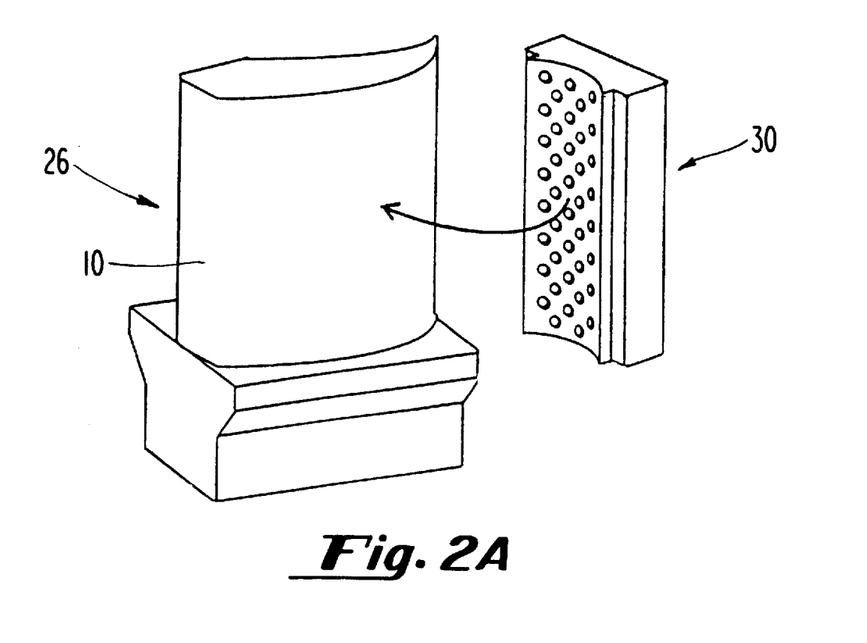
FIGS. 2A–2C illustrate fabrication of tabs onto a spar by an electrochemical machining operation in accordance with the invention.
Figure 2B:
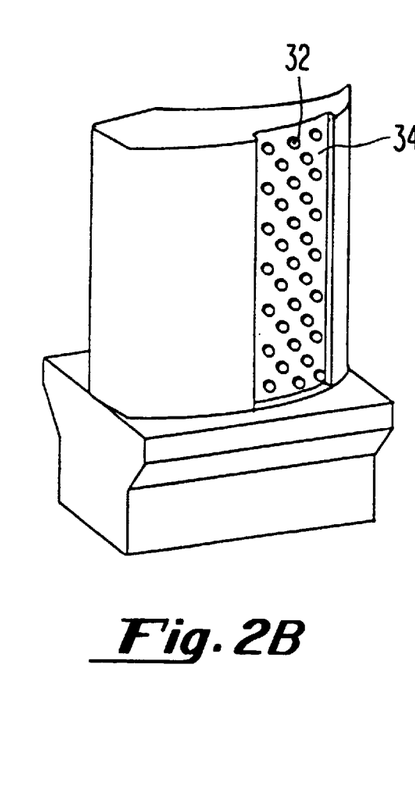
Figure 2C:
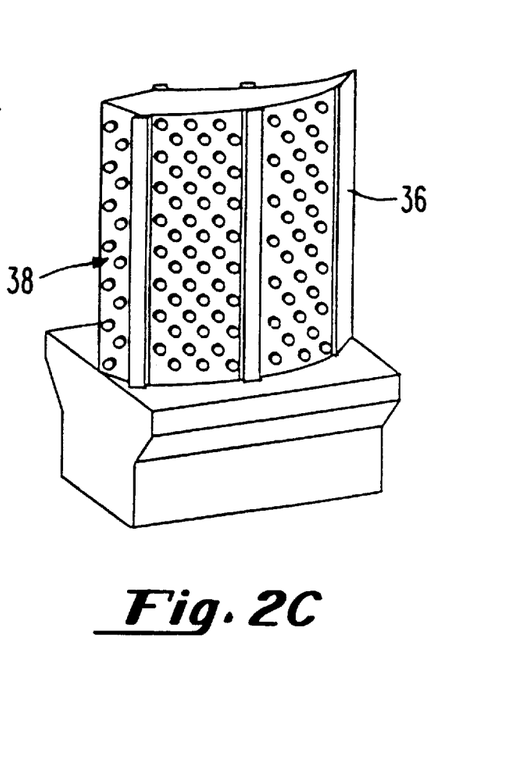

Referring to FIGS. 2A–2C, prior to bonding of the skin sub-structure onto the spar, fabrication of pin fins, or tabs, onto the spar by an electrochemical or electrodischarge machining operation is carried out. Electro-chemical machining apparatus 30, shown generally in FIG. 2A, is brought into contact with a portion of the outer surface of the spar 10. The electro-chemical machining apparatus 30 is configured to machine away a portion of the outer surface of the spar, leaving a plurality of pin fins 32 extending from the finished spar outer surface 34 resulting from the machining operation. The electro-chemical machining operation is repeated over adjacent portions of the spar to provide a desired configuration of pin fins 32 and a finished spar outer surface 34. The repeated electro-chemical machining operations carried out over portions of the spar outer surface can be performed to leave a plurality of skin attachment ribs 36 extending from the finished spar outer surface 34. Formation of the pin fins 32, as well as the skin attachment ribs 36, on the finished spar outer surface 34 provide attachment surfaces for bonding of the skin to the spar in the manner described below and create channels 38 for a flow of cooling fluid below the skin surface.

The electro-chemical machining apparatus 30 provides for the removal of oxide from the outer surfaces of the finished spar outer surface 34, pin fins 32 and the skin attachment ribs 36 and provides the required dimensional tolerances for the spar design. One of ordinary skill in the art will appreciate the general representation of the electrochemical machining apparatus illustrated herein. The apparatus necessary to provide the machining operations described herein, as well as the electro-chemical machining techniques, are well known and capable of being used in practice by those skilled in the art to provide the desired component configurations.

Figure 3:
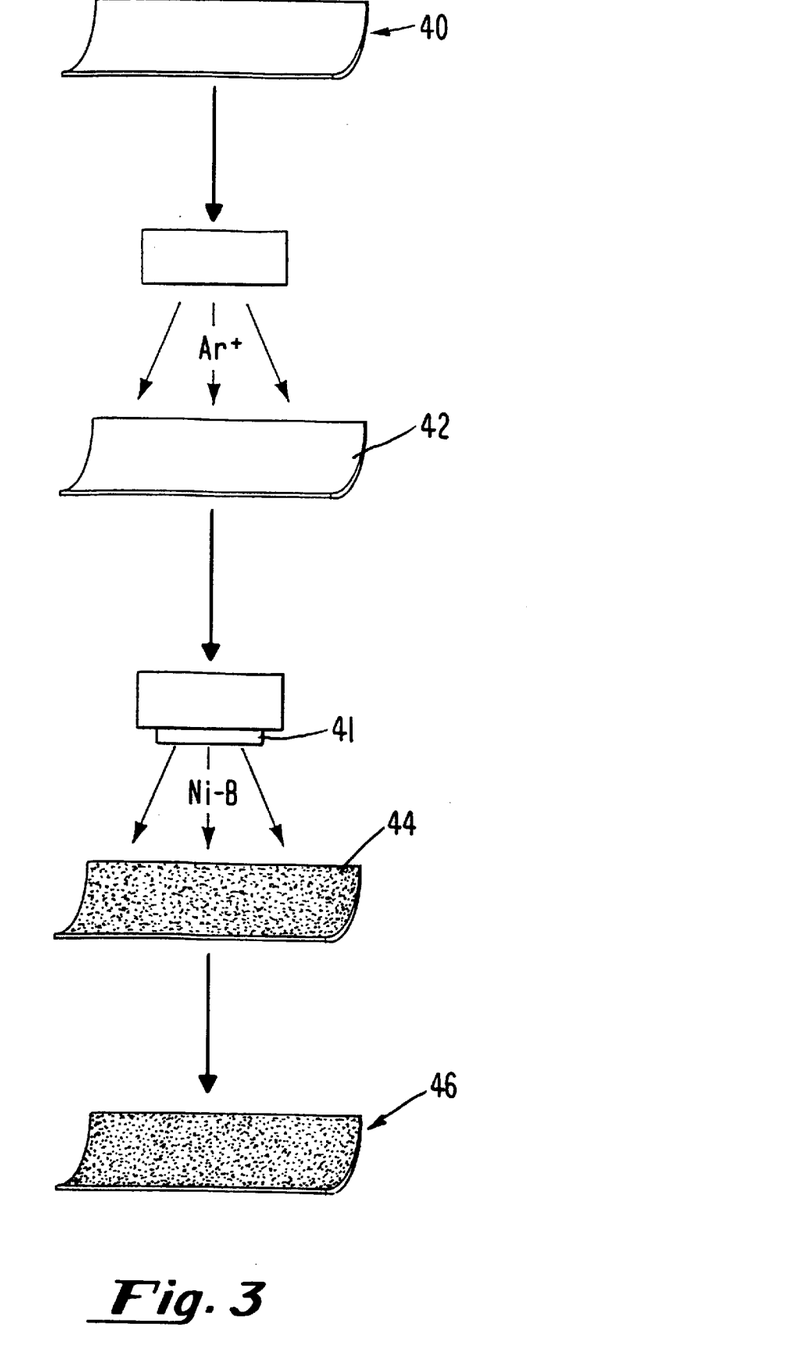
FIG. 3 illustrates a first embodiment of application of TLP bonding material layer to a faceplate sub-structure by sputter deposition in accordance with the invention.

The complex overall configuration for the skin of the turbine blades or vanes is attached to the spar as a plurality of simple geometry skin sub-structures by a TLP bonding application in accordance with the invention. FIG. 3 illustrates a first embodiment of the application of a TLP bonding material layer to a skin faceplate sub-structure by sputter deposition in accordance with the invention. A skin faceplate 40 sub-structure is provided for bonding to the spar that has been machined with a plurality of pin fins and ribs in the manner described. The plurality of skin faceplates 40 that will form the final skin configuration can be individually cast as simple geometry skin sub-structures, or the overall skin configuration can be cast as a unitary shell and subsequently sectioned to form the plurality of simple geometry faceplates 40 for attachment to the spar. After casting, the faceplates can be electro-chemically machined to remove oxides and ensure dimensional tolerances for the skin design.

A layer of TLP bonding material is applied to the skin attachment surfaces of the faceplates in a preferred embodiment by sputter deposition. The skin faceplates 40 are placed into a sputter deposition tank, shown generally in FIG. 3. The sputter deposition apparatus is first operated to remove oxide from the inner mating surface 42 of the faceplates 40 by reversing the polarity of the sputtering unit to sputter etch the inner mating surface 42 by bombardment with Argon ions or other inert gas ions. Subsequently, the sputtering unit is operated to sputter deposit a layer 44 of bonding material from the target 41 onto the inner mating surface 42 of the skin faceplates 40. As discussed, the TLP bonding material sputter deposited onto the inner mating surface of the faceplates is preferably a nickel-based composition with boron added as a TLP bonding agent. After the sputter deposition operation, the faceplate 46 having the bonding material thereon is ready for attachment to the spar to complete the assembly of the turbine blade.

Figure 4:
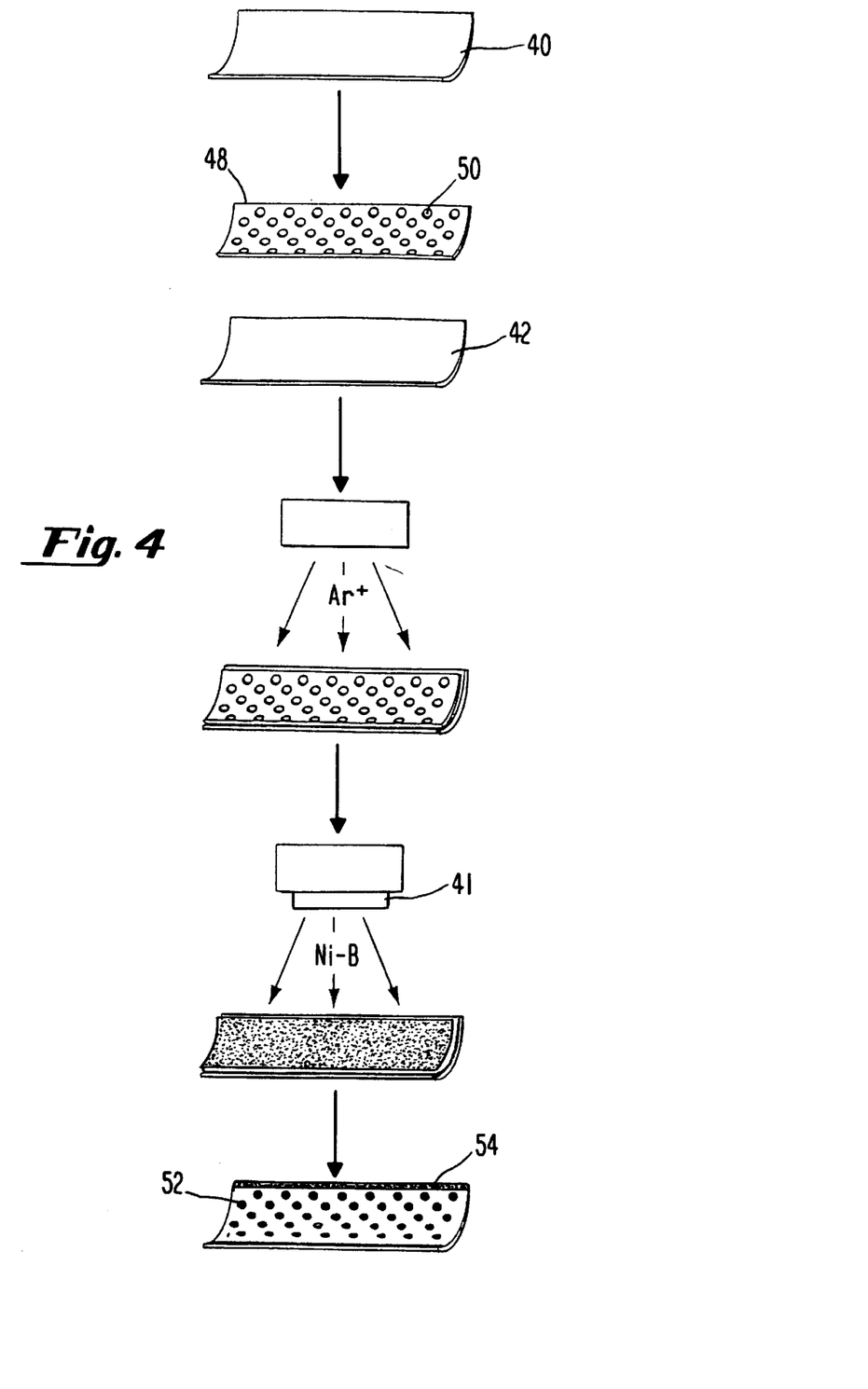
FIG. 4 illustrates a second embodiment of application of TLP bonding material layer to a faceplate sub-structure by sputter deposition in accordance with the invention.

An alternative to coating the entire inner mating surface of the faceplates with a layer of bond material is selective application of bond material at predetermined locations on the faceplate inner mating surface 40. FIG. 4 illustrates selective application of TLP bonding material layer to a faceplate using masks in accordance with the invention. Prior to sputter etching and sputter deposition of bond material onto the mating surface of the faceplate, a mask is positioned over the mating surface 42. Preferably, the mask is configured with a plurality of apertures 50 that correspond in location to the arrangement of the pin fins on the portion of the spar onto which the faceplate will be bonded. Also, the mask is configured so as not to cover the outer edges of the mating surface 42, which correspond to the location of the skin attachment ribs on the portion of the spar onto which the faceplate will be bonded.

In this embodiment, when the faceplate 40 having the mask 48 thereon is sputter etched to remove oxide in the sputter deposition tank, only those portions not covered by the mask 48 will have oxide removed therefrom. Similarly, during the sputter deposition of bonding material onto the inner mating surface of the faceplate, only those portions not covered by the mask will have a layer of bond material applied thereto. Accordingly, when the mask is removed from the faceplate after the sputter deposition step, the inner mating surface 42 has a plurality of islands 52 of bond material thereon, as well as strips 54 of bond material along the outer edges of the mating surface. The islands 52 of bond material will correspond to the arrangement of the pin fins on that portion of the spar to which each skin faceplate sub-structure is attached by TLP bonding. Also, the strips 54 of bond material will line up with the skin attachment ribs.

As a result of the presence of the mask 48 during the sputter etching step and the subsequent sputter deposition of bond material onto the inner mating surface of the faceplate, the areas of the finished spar outer surface 34 surrounding the islands 52 of bond material and the material adjacent to the islands on the faceplate 40 will have oxide thereon. Thus, the islands of boron-rich bond material are isolated and do not flow away during the TLP bonding process due to the presence of the oxide. Accordingly, the use of masks in accordance with the invention permits predetermined application of the TLP bonding material to only the desired locations on the sub-structure surfaces that are necessary for the joinder of those sub-structures by application of the TLP bonding step. The use of the masks to selectively apply bond material to only the desired surfaces eliminates the application of excessive amounts of bonding material to the sub-structures, which could otherwise have the adverse effects on the final component structure that have been described above. One of ordinary skill in the art will appreciate the laborious and extremely time consuming operation that would have been necessitated in accordance with prior art techniques for applying foil or powdered bond material only at select locations on the sub-structure mating surfaces, without application of the bond material onto the adjacent regions of the sub-structure.

Figure 5A:
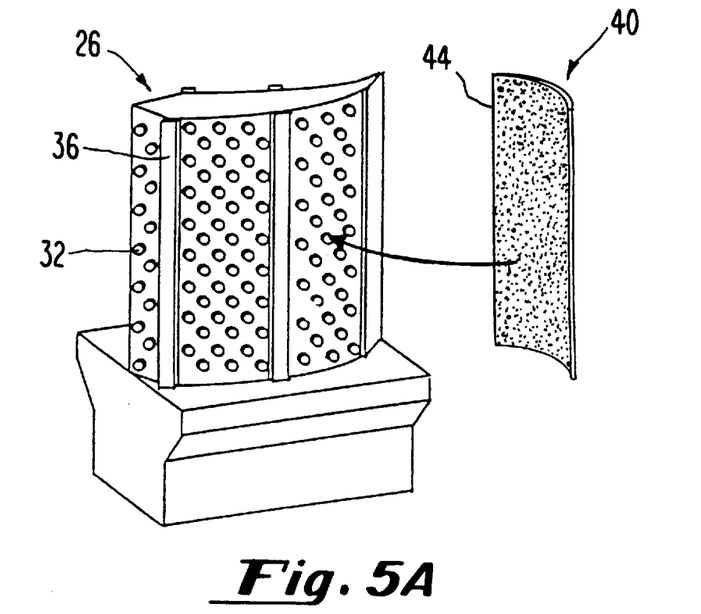
FIGS. 5A–5C illustrate a first embodiment of an assembly of faceplate sub-structures onto a spar sub-structure in accordance with the present invention.
Figure 5B:
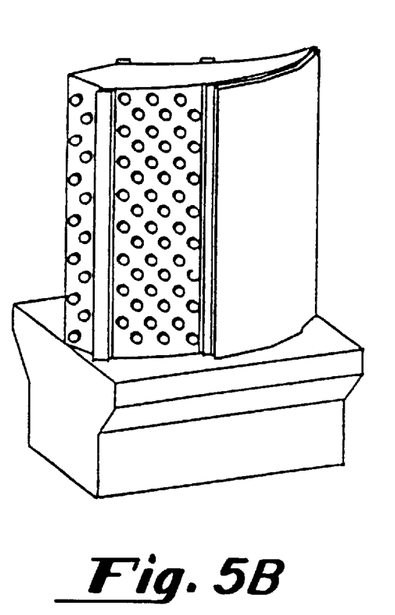
Figure 5C:
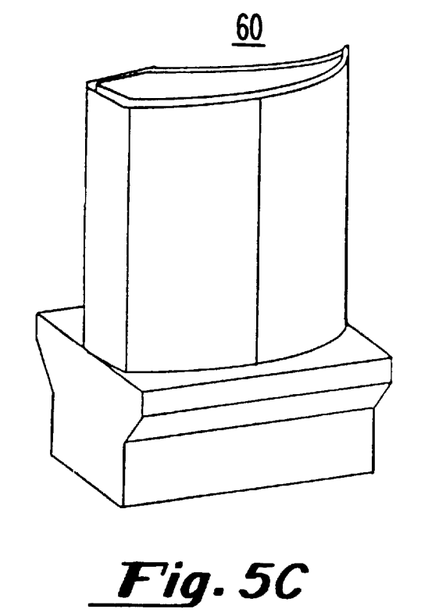

Once the bond material has been applied to the mating surfaces of the face plates, the faceplate sub-structures are aligned at their respective locations on the spar for TLP bonding. FIGS. 5A–5C illustrate a first embodiment of an assembly of faceplate sub-structures onto a spar sub-structure in accordance with the present invention. Each of the faceplates 40 having a layer 44 of TLP bonding material on the inner mating surface 42 is positioned on the spar 26 such that the mating surface 42 contacts the outer mating surfaces of the pin fins 32 and skin attachment ribs 36. These combined sub-structures are then subjected to a high temperature TLP heat soak in an oxygen-free furnace in the manner described above so as to bond the skin sub-structures to the spar. The resulting component configuration is a TLP bonded turbine blade 60 having a complex aerodynamic profile.

Figure 6A:
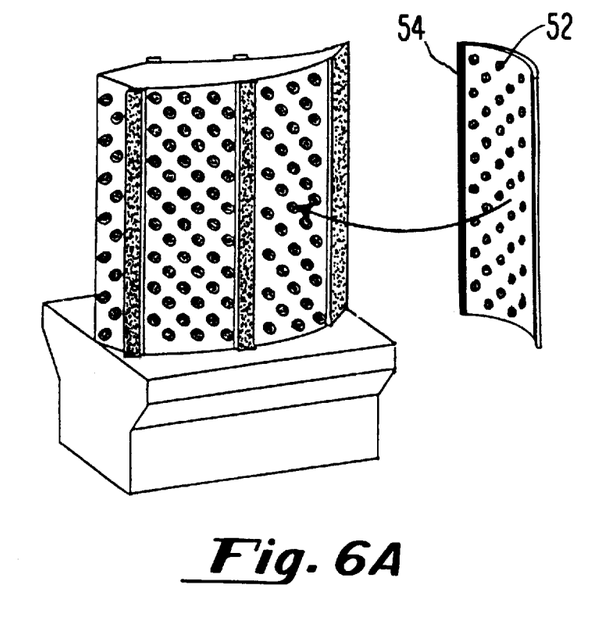
FIGS. 6A–6C illustrate a second embodiment of an assembly of faceplate sub-structures onto a spar sub-structure in accordance with the present invention.
Figure 6B:
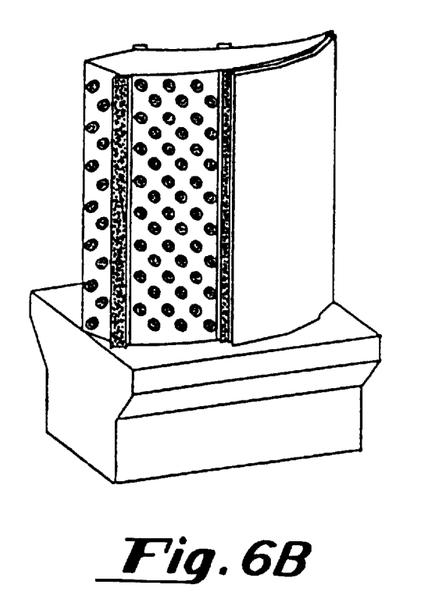
Figure 6C:
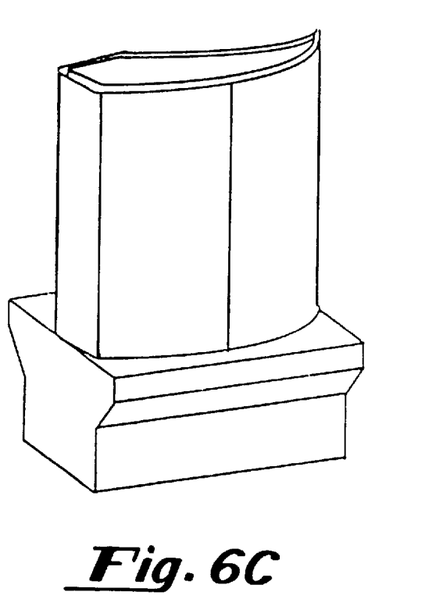

As shown in FIGS. 6A–6C, where the bond material is applied as islands 52 and strips 54 onto the mating surface of the faceplate sub-structure, these islands and strips will be aligned with their corresponding pin fins and ribs on the spar for TLP bonding. As shown in this embodiment, TLP bonding material can also be applied to the pin fins and ribs of the spar. It should also be noted that the process is not intended to be limited to construction of the blade assembly illustrated herein and the process can be used for the construction of a wide variety of component configurations. For example, the process can be practiced to machine the pin fins and ribs of the turbine blade into the skin faceplate sub-structures, rather than the spar sub-structure.

The present invention may be embodied in other specific forms without departing from the spirit or essential attributes thereof and, accordingly, reference should be made to the appended claims, rather than to the foregoing specification, as indicating the scope of the invention.

What is claimed is:

1. A process for constructing a component of a combustion turbine from a plurality of component sub-structures, each said sub-structure comprising a substrate material, and each said sub-structure having at least one mating surface, said process comprising the steps of:

(a) machining said mating surface of each said sub-structure to remove oxide therefrom;

(b) masking the mating surface of the sub-structure assembly to define an area of desired contact between sub-structures;

(c) applying a layer of bond material on said defined area of said mating surface of at least one of said sub-structures by sputter deposition, said bond material having a melting point depressant therein having a melting point temperature;

(d) assembling each said sub-structure to form said component by positioning opposing mating surfaces of each said sub-structure into contact with each other with said layer of bond material disposed between the opposing mating surfaces; and (e) exposing the sub-structure assembly to an environment having a temperature higher than said melting point temperature, whereby said melting point depressant diffuses into said substrate material of said sub-structure assembly and said bond material solidifies to form a bond between opposing mating surfaces of said sub-structure assembly.

2. The process of claim 1, wherein said machining step comprises electro-chemical machining of said mating surface of each said sub-structure.

3. The process of claim 1, wherein said machining step comprises micro-machining of said mating surface of each said sub-structure.

4. The process of claim 1, wherein said bond material comprises the same material as said substrate material of said sub-structures.

5. The process of claim 4, wherein said substrate material of said sub-structures comprises a nickel-based alloy.

6. The process of claim 5, wherein said melting point depressant comprises boron.

7. The process of claim 1, further comprising the step of sputter etching said mating surface to remove oxide therefrom before said step of applying a layer of bond material on said mating surface.

8. The process of claim 1, wherein oxide is removed only from said selected portions of said mating surface.

9. A process for constructing a component of a combustion turbine from a plurality of component sub-structures, said process comprising the steps of:

(a) forming a spar sub-structure;

(b) forming a plurality of skin faceplate sub-structures, each said skin faceplate sub-structures having a mating surface;

(c) machining a plurality of pin fins on said spar sub-structure, each said pin fin having an outer surface, wherein oxide is removed from said outer surface of said pin fins during said machining step;

(d) applying a layer of bond material on said mating surface of said skin faceplate sub-structures by sputter deposition, said bond material having a melting point depressant therein having a melting point temperature;

(e) assembling said skin faceplate sub-structures onto said spar sub-structure with said mating surface contacting the outer surfaces of a group of said pin fins with said bond material disposed therebetween; and (f) exposing the sub-structure assembly to an environment having a temperature higher than said melting point temperature, whereby said melting point depressant diffuses into said spar sub-structure and said skin faceplate sub-structures and said bond material solidifies to form a bond between said pin fins and said mating surfaces of said skin faceplate sub-structures.

10. The process of claim 9, wherein said machining step comprises electro-chemical machining.

11. The process of claim 9, wherein said machining step comprises micro-machining.

12. The process of claim 9, further comprising the steps of applying a mask onto said mating surface of said skin faceplate sub-structures before said step of applying a layer of bond material on said mating surface, said mask having a plurality of apertures therein corresponding to the arrangement of said pin fins on said spar sub-structure, and removing said mask from said mating surface after said step of applying a layer of bond material on said mating surface.

13. The process of claim 12, further comprising the step of sputter etching said mating surface having said mask thereon before applying a layer of bond material on said mating surface.

14. The process of claim 13, wherein said sputter etching step is characterized in that said mating surface is bombarded with Argon ions.

15. The process of claim 1 wherein one of said sub-structures comprises an air foil for a turbine blade and the machining process comprises the steps of:

positioning a mask over at lease a portion of a surface area of the air foil, the mask establishing a first selected area of the air foil to be machined;

machining the first selected surface area established by the mask;

moving and repositioning the mask to overlay a second selected surface area of the air foil adjacent to but spaced from the first selected area so as to define an un-machined strip between the selected areas;

machining the second selected surface area established by the mask;

repeating the steps of moving and machining until all mating surfaces except for strips between the selected surface areas have been machined on the air foil;

machining others of the sub-structures for mating engagement with the air foil, wherein the others of the sub-structures are machined along edges thereof for overlaying the strips between the selected surface areas so as to form a smooth, continuous surface on the air foil.

16. The process of claim 15 wherein the mask positioned on the air foil comprises a plate having a plurality of spaced holes formed therethrough, said step of machining comprising the step of electro-chemical etching of the air foil surface with the mask so as to create a surface having a plurality of spaced pin fins formed thereon.

17. The process of claim 16 wherein the step of applying comprises applying the layer of bond material to others of the sub-structures and further includes the steps of positioning another mask over each of the others of the sub-structures, the another mask having holes therethrough at locations corresponding to the pin fins whereby the bond material is only applied at such pin fin locations.

* * * * *